US006969122B2

(12) United States Patent
Sachs et al.

(10) Patent No.: US 6,969,122 B2
(45) Date of Patent: Nov. 29, 2005

(54) SEAT BELT EXTENDER

(76) Inventors: David A. Sachs, 2541 Calle Terebroso, Las Cruces, NM (US) 88005; Donald J. Thome, 5196 Hunters Chase Rd., Las Cruces, NM (US) 88011

( * ) Notice: Subject to any disclaimer, the term of this patent is extended or adjusted under 35 U.S.C. 154(b) by 41 days.

(21) Appl. No.: 10/624,501

(22) Filed: Jul. 23, 2003

(65) Prior Publication Data

US 2005/0017567 A1 Jan. 27, 2005

(51) Int. Cl.[7] .............................................. B60R 22/00
(52) U.S. Cl. .................................... 297/468; 280/801.1
(58) Field of Search ................................ 297/468, 482, 297/483; 280/801.1

(56) References Cited

U.S. PATENT DOCUMENTS

| | | | | |
|---|---|---|---|---|
| 4,119,344 A | * | 10/1978 | Kondo | 297/468 |
| 4,157,841 A | * | 6/1979 | Bergman et al. | 297/482 |
| 4,408,373 A | | 10/1983 | Miskowicz | |
| 4,555,832 A | * | 12/1985 | Sano et al. | 24/682.1 |
| 4,610,463 A | | 9/1986 | Efrom | |
| 4,645,231 A | * | 2/1987 | Takada | 297/482 |
| 4,699,401 A | | 10/1987 | Saenz | |
| 4,758,048 A | | 7/1988 | Shuman | |
| 4,915,451 A | * | 4/1990 | Forget et al. | 280/801.1 |
| 4,966,393 A | * | 10/1990 | Tokugawa | 297/468 |
| 5,071,193 A | * | 12/1991 | Childress et al. | 297/468 |
| 5,080,396 A | | 1/1992 | Vacanti | |
| 5,080,441 A | | 1/1992 | Stevenson et al. | |
| 5,098,162 A | * | 3/1992 | Forget et al. | 297/482 |
| 5,135,257 A | | 8/1992 | Short | |
| 5,215,333 A | | 6/1993 | Knight | |
| 5,248,187 A | | 9/1993 | Harrison | |
| D352,591 S | | 11/1994 | Laney | |
| 5,381,590 A | * | 1/1995 | Liou et al. | 24/602 |
| 5,570,933 A | | 11/1996 | Rouhana et al. | |
| 5,620,231 A | | 4/1997 | Marker et al. | |
| 5,788,282 A | | 8/1998 | Lewis | |
| 5,795,030 A | | 8/1998 | Becker | |
| 5,836,656 A | | 11/1998 | Baggott | |
| 6,312,015 B1 | | 11/2001 | Merrick et al. | |
| 6,343,841 B1 | | 2/2002 | Gregg et al. | |
| 6,520,392 B2 | | 2/2003 | Thibodeau et al. | |
| 2002/0038809 A1 | | 4/2002 | Thibodeau et al. | |

FOREIGN PATENT DOCUMENTS

| | | |
|---|---|---|
| DE | 3342594 | 6/1995 |

* cited by examiner

*Primary Examiner*—Peter R. Brown
(74) *Attorney, Agent, or Firm*—Richard C. Litman

(57) ABSTRACT

The seat belt extender is a length of material having limited flexibility, with a male seat belt latch tongue extending from one end and a female seat belt latch receptacle extending from the opposite end. The seat belt extender is installed in an existing, conventional three point seat belt system in a vehicle by inserting the tongue into the receptacle of the short anchor strap generally located at the inboard side of the seat, near the center of the vehicle. The semi-rigid nature of the present extender causes it to remain generally upright when secured to the anchor strap, thus enabling a person having limited upper body mobility to easily access the receptacle end of the extender with the tongue of the existing belt and shoulder strap assembly. The present extender also serves to position the shoulder strap more toward the center of the upper body of an occupant.

3 Claims, 3 Drawing Sheets

SEAT BELT EXTENDER

BACKGROUND OF THE INVENTION

1. Field of the Invention

The present invention relates generally to restraint devices and systems, and more particularly to a seat belt extender which serves to displace the seat belt and shoulder harness connection toward the center of the lap of the wearer in an otherwise conventional seat belt and shoulder harness assembly. The present extender is formed of a relatively short length of material having limited flexibility in order to provide sufficient stiffness to enable attachment using only one hand, yet provides sufficient flexibility to conform to the side of the occupant seat and the hip of a person using the device when the belt and shoulder harness system is secured across the person.

2. Description of the Related Art

Occupant restraint systems installed in automobiles and most light aircraft have evolved to have a three point configuration comprising a two part seat belt assembly with one belt shorter than the other and the two belts latching near one hip of the occupant, with a shoulder strap which passes diagonally across the trunk of the wearer to secure at the seat belt latch assembly. This arrangement is nearly universal in such vehicles, and normally provides adequate restraint and is relatively economical to manufacture and install. With its single latch tongue for the longer seat belt end and the lower end of the shoulder strap joined thereto and the single short seat belt length with its latch receptacle, this three-point anchor configuration is al so easily latched by a person having normal physical dexterity.

It is a different matter for persons having limited flexibility in their upper bodies, e.g. those suffering from shoulder tendonitis or having recent rotator cuff surgery, and/or having an arm in a sling. The conventional three point belt and harness system described above requires the user to turn or twist at least slightly toward the laterally offset female receptacle of the assembly in order to insert the male tongue of the longer belt end and attached shoulder strap. This also requires that the occupant reach across his or her body with the hand grasping the belt and harness latch tongue to insert the latch tongue into the offset receptacle at one side of the occupant. While such an action is not a problem for a person with normal mobility, it can be agonizing, or perhaps impossible, for a person suffering from arthritis, bursitis, tendonitis, rotator cuff inflammation, or various other ailments which limit arm and shoulder mobility.

Many women also experience difficulty with such conventional three point restraint systems. Such restraint systems have generally been developed around the upper body configuration of the average adult male, and often do not fit persons who are outside of this average. Many women have found that when such conventional seat belt and shoulder harness systems are secured conventionally, the shoulder strap passes over or across the inboard breast, i.e. the left breast of a woman seated in the right seat of a vehicle. This is uncomfortable at the least, and could lead to further injuries in the event of an accident. As a result, many women have resorted to impromptu adjustments, such as twisting the joined ends of the longer seat belt portion and its attached shoulder harness to wrap the shoulder harness about the belt and displace its juncture with the belt away from the buckle, before inserting the latch tongue into the anchor receptacle. In fact, the relevant art shows various devices which may be used to move the belt and shoulder harness connection farther from the short seat belt anchor end, but they do nothing to assist a handicapped person to fasten his or her belt.

Accordingly, a need will be seen for a seat belt extender which secures removably to the female receptacle at the free end of the conventional short seat belt and shoulder harness anchor, and which provides for the attachment of the male latch tongue extending from the longer seat belt and shoulder harness assembly. The present seat belt extender comprises a length of material having limited flexibility, with a male latch tongue on one end and a female receptacle on the opposite end. The stiff, but non-rigid body of the extender provides sufficient stiffness to hold the end of the device in place for an occupant to apply the male tongue using only one hand and sufficient length to displace the buckle assembly toward the center of the body of the occupant, yet provides sufficient flexibility to conform to the occupant's body when installed.

A discussion of the related art of which the present inventor is aware, and its differences and distinctions from the present invention, is provided below.

U.S. Pat. No. 4,408,373 issued on Oct. 11, 1983 to John S. Miskowicz, titled "Buckle With Integral Push Button Spring And Reaction Portions," describes a female receptacle or buckle having what is presently considered to be a generally conventional configuration. Miskowicz does not disclose any form of belt and harness assembly with which his buckle may be used. However, he does show a slot in his buckle, opposite the receptacle for the male tongue of a seat belt or the like, which is intended for the installation of a belt or webbing therethrough. This arrangement is relatively flaccid, and cannot hold the buckle upright in a semi-rigid installation, as does the present seat belt extender.

U.S. Pat. No. 4,610,463 issued on Sep. 9, 1986 to Harriet Efrom, titled "Protection Assembly For Abdominal Area," describes a relatively rigid shell which is configured to fit over the abdomen of a pregnant woman. The shell includes a series of hooks or guides extending therefrom, to secure an existing conventional seat belt therein. However, Efrom does not disclose any form of extender for the existing belt assembly, in order to facilitate securing the belt and/or to move the attachment point between the longer belt and shoulder harness assembly and the shorter anchor section, closer to the center of the body of the occupant.

U.S. Pat. No. 4,699,401 issued on Oct. 13, 1987 to Raul C. Saenz, titled "Removable Seat Belt Cover," describes a cover or sheath configured for removably placing about the shoulder strap of a conventional three-point seat belt and shoulder harness assembly. The Saenz belt cover does not actually engage the seat or lap belt portion of the assembly, and does nothing to alter or adjust the relative location of the buckle of the assembly when the various belts and straps are secured together during use.

U.S. Pat. No. 4,758,048 issued on Jul. 19, 1988 to Raymond L. Shuman, titled "Attachment Clip For Web Type Belts," describes a series of metal clips which are installed along the three conventional portions of a three-point belt and harness system. These clips are permanently installed by disassembling the conventional belt webbing from their hardware and passing the webbing through passages in the clip, and then reinstalling the webbing straps to their anchor or attachment points. The Shuman clips are used to attach additional flaccid webbing straps to form an overlying three point harness system, for securing a small child or the like to the front of the conventional three point harness system when an adult guardian is secured therein. Thus, the Shuman system does nothing to relocate the attachment buckle for the existing seat belt and shoulder harness assembly nor to provide an upstanding anchor point extension, as provided by the present invention.

U.S. Pat. No. 5,080,396 issued on Jan. 14, 1992 to Sam D. Vacanti, titled "Clip Device For Seat Belts," describes a device having two opposed flat hooks joined by an adjustable length tether. One of the hooks secures to the longer lap belt portion of a conventional three-point seat belt and shoulder harness assembly, while the opposite hook secures to the shoulder harness strap essentially directly above the lap belt hook. The Vacanti device is intended to adjust the position of the shoulder strap by drawing the strap downwardly, thereby adjusting its position across the chest of the occupant. While this device may improve the comfort of a person using the system, particularly women, it does nothing to move the position of the three-point latch assembly, and nothing to reposition the latch assembly for easier access by a person with limited upper mobility, as provided by the present invention.

U.S. Pat. No. 5,080,441 issued on Jan. 14, 1992 to Jennifer L. Stevenson et al., titled "Safety Seat For A Child For Airplane Use," describes a padded bolster which is placed across the lap of the child, with the conventional two-point seat belt assembly being secured across the bolster. The bolster includes a pair of generally vertical straps extending therefrom, which secure between the legs and extend rearwardly up and over the shoulders of the child, passing in front of the upper body of the child to secure to the top of the bolster. The Stevenson et al. bolster and harness assembly does nothing to change the latch position of the lap belt, which is generally disposed centrally across the lap of the occupant in such a two-point belt system.

U.S. Pat. No. 5,135,257 issued on Aug. 4, 1992 to Thomas T. Short, titled "Adjustable Breakaway Seat Belt Shoulder Harness Comfort Strap," describes a strap which attaches to the lap belt and extends to draw down the shoulder strap of a conventional three-point harness system. The Short device thus functions essentially identically to the device of the Vacanti '396 U.S. Patent discussed further above and has the same limitation, i.e., it does nothing to change the latch position for the three-point assembly to facilitate latching by persons having limited mobility.

U.S. Pat. No. 5,215,333 issued on Jun. 1, 1993 to Candice T. Knight, titled "Seat Belt Adjustment Band," describes a sleeve which wraps about the combined longer seat belt portion and shoulder strap attached thereto at the buckle, to draw the two straps together at some distance from the buckle. This has the effect of causing the shoulder strap to join the lap belt at some distance from the latch or buckle assembly, thus positioning the effective end of the shoulder strap closer to the center of the body of the occupant. A review of FIGS. 1 and 2 of the Knight patent clearly shows the advantage of repositioning the location of the shoulder strap across the upper body of the occupant, particularly in the case of a female occupant. However, the Knight device does nothing to relocate the attachment end of the seat belt and shoulder harness assembly to facilitate latching the assembly by a person having limited upper body flexibility. The present invention not only serves to adjust the position of the seat belt and shoulder harness juncture to provide the advantages of the Knight device and others noted further above, but also relocates the attachment point for the seat belt and shoulder harness assembly to facilitate attachment of the assembly to the anchor end.

U.S. Pat. No. 5,248,187 issued on Sep. 28, 1993 to Rick G. Harrison, titled "Seat Belt Extension Apparatus," describes an extension length comprising a flaccid web having a male and a female buckle or latch component on opposite ends. Harrison provides various accessories which may be secured to his belt extension, such as a pad, bill or change holders for tolls, and an audible device for maintaining driver alertness. However, the belt extension is a flexible, flaccid length of webbing material in each case. Such a flexible component cannot stand on its own after being connected to the short central anchor length of the three-point harness assembly. This limited flexibility of the present seat belt extender is absolutely critical to its function, as it holds the female receptacle of the extender in an upright position for ease of connecting the male tongue of the conventional belt and shoulder harness thereto, using only one hand if so required. Yet, the present extender has sufficient flexibility to conform to the side of the seat and/or the hip of the occupant, to allow the lap belt to lie directly across the lap of the occupant rather than being held away from the occupant's lap.

U.S. Pat. No. 5,570,933 issued on Nov. 5, 1996 to Stephen J. Rouhana et al., titled "Lap-Shoulder Belt Extender," describes an extension assembly having both a seat belt extender portion and a shoulder harness extender portion. Both portions are formed of a flaccid webbing material essentially identical to conventional seat belt and shoulder harness webbing material. Rouhana et al. recognize the relocation of the shoulder harness and seat belt juncture when using an extension with a three-point harness system, but provide a shoulder harness extension which extends from the shoulder harness to the short anchor end of the seat belt and harness assembly. This shoulder harness extension is secured to the original shoulder strap by an attachment means which is relatively difficult and cumbersome to attach and remove. The Rouhana et al. system is thus intended to remain in place on the existing lap belt and shoulder harness assembly and to be latched and released at the original short anchor end of the three point assembly, rather than being more or less permanently left in place attached to the anchor end and using the conventional lap belt and shoulder harness tongue for attachment and release from the extension, as in the present invention. In any event, the flaccid nature of the webbing of the Rouhana extension does not permit it to be used as a freestanding attachment, as is the case with the present extension.

U.S. Pat. No. 5,620,231 issued on Apr. 15, 1997 to Duane L. Marker et al., titled "Seat Belt Threader Assembly For Child Safety Seats," describes various embodiments of a device intended for threading through the attachment points of a child safety seat, attaching to the end of a conventional seat belt, and drawing the belt through the child seat anchor points to facilitate installation of the child seat in a vehicle. The Marker et al. device has a rigid handle in each embodiment, with at least one embodiment having a rigid extension portion. However, the Marker et al. device cannot be secured to the existing seat belt system for restraining an occupant in the vehicle, as none of the embodiments include both male and female latch members at opposite ends of the device.

U.S. Pat. No. 5,788,282 issued on Aug. 4, 1998 to Donald J. Lewis, titled "Safety Belt Adaptor For Belt Adjustment For Vehicle Occupants And Method Of Operation," describes a belt extender formed of conventional flaccid fabric webbing material or the like, and having a male and a female latch component on opposite ends. The Lewis device has to be formed of a relatively flexible material, to allow the material to be gathered and adjusted to adjust the length of the device. Thus, the Lewis extender is not free standing, and cannot be used to facilitate the securing of the conventional lap belt and shoulder harness assembly thereto by an occupant having limited shoulder, arm, and/or upper body mobility.

U.S. Pat. No. 5,795,030 issued on Aug. 18, 1998 to Karl W. Becker, titled "Abdomen-Protective Adapter For Seat Belts," describes two different embodiments of such an adapter. The first embodiment secures between the existing ends of a two-point lap belt assembly, but does not address the attachment of a shoulder harness strap thereto. While one end of the belt assembly may have a shoulder harness strap attached thereto, the flaccid nature of the padded construction of the Becker device precludes its use as a standup seat belt anchor extension, as provided by the present invention. The three point belt and harness attachment embodiment of the Becker adapter has edges which merely wrap around the existing seat belt and shoulder harness straps, and has no buckle or latch components for attachment between the existing latch and buckle components of the conventional three point harness system.

U.S. Pat. No. 5,836,656 issued on Nov. 17, 1998 to Ronald M. Baggott, titled "Child Restraint," describes a seat belt extender having a child harness comprising a waist band and a crotch strap attached to the front thereof. The Baggott child restraint is intended for airline type seat belt assemblies where the two belt attachment ends meet approximately in the center of the lap of the occupant. The Baggott restraint cannot be used successfully in a three point system with its laterally offset latch assembly, as the child restraint would be positioned over one hip of the occupant, rather than centered on the occupant's lap. In any event, the flaccid webbing used for the extender portion of the Baggott restraint harness cannot provide the free standing structure to facilitate one handed attachment of a seat belt and shoulder harness latch assembly, as can the present seat belt extender invention.

U.S. Pat. No. 6,312,015 issued on Nov. 6, 2001 to David D. Merrick et al., titled "Clamp For Retractor Belt," describes various embodiments of a device including a permanently installed track adjacent the anchor end of the shoulder harness strap, and a clamp which selectively locks the shoulder harness strap to the track. The Merrick et al. device is intended to provide some slack in the shoulder harness for greater comfort of the occupant, to relieve the tension produced by the conventional tensioner device at the anchor end of the shoulder harness strap. The Merrick device does nothing to adjust the attachment point of the combined seat belt and shoulder harness to the shorter anchor end of the three point assembly, as provided by the present seat belt extender invention.

U.S. Pat. No. 6,343,841 issued on Feb. 5, 2002 to Robert W. Gregg et al., titled "Seat Belt Extension," describes a relatively short extension formed of flaccid webbing material and having a male and a female latch portion on opposite ends thereof. An elongate pocket is provided on the surface of the extension web, for the insertion of a resiliently flexible sheet of material therein. The intent of the Gregg et al. seat belt extension and its flexible insert is to prevent the twisting of the extension, thereby causing it to lie flat while in use for greater comfort of the occupant. However, the pocket with its insert does not extend to each latch component at the opposite ends thereof, in order to hold them in alignment with the rest of the insert. The male tongue portion extends from the flaccid end of the insert, and is free to swing back and forth. This is even more true of the female latch component, which is secured to the webbing material by a loop of webbing material which passes through a corresponding passage in the attachment portion of the female latch. Thus, the female latch is free to swing back and forth due to the loose attachment of the webbing loop thereto. This arrangement cannot hold the female latch receptacle upright to allow the existing male latch component of the seat belt and shoulder harness assembly to be inserted therein using only one hand by a person having limited mobility; the female latch receptacle of the Gregg et al. extension, would have to be held upright using one hand, while the other hand is used to insert the male tongue into the female receptacle. This is not true of the present invention, which provides sufficient rigidity to hold the female receptacle of the extension in an upright position, where the male tongue of the seat belt and shoulder harness can be inserted therein without need to hold the female receptacle.

U.S. Patent Publication No. 2002/38,809 published on Apr. 4, 2002 to Daniel D. L. Thibodeau et al., titled "Backup Buckle For A Seat Belt," describes an extender comprising an elongate, rigid length of material having male and female attachment components on opposite ends thereof. The Thibodeau device can be secured between the existing short anchor receptacle and the longer seat belt and shoulder harness attachment tongue of an existing belt and shoulder harness assembly, to provide an alternate release point in an emergency. Thibodeau states that his device is sufficiently rigid and massive so as to be useful as a striking tool and/or pry bar (page 3, paragraph 43). Thus, while the Thibodeau device has sufficient rigidity to stand upright when latched to the short anchor section of the restraint assembly, it cannot bend or flex to conform to the curvature of the side of a vehicle seat and/or the hip of an occupant seated in the seat, as can the present seat belt extender. Such a hard, rigid construction may result in serious injury to an occupant in the event of an accident, due to the non-yielding structure of the Thibodeau extension.

U.S. Pat. No. 6,520,392 issued on Feb. 18, 2003 to Daniel D. L. Thibodeau, titled "Backup Buckle For A Seat Belt," is the issued patent resulting from the application of the above described '809 U.S. Patent Publication to the same inventor. The same points noted in that discussion are seen to apply here as well.

U.S. Des. Pat. No. 352,591 issued on Nov. 22, 1994 to Edgar Laney, titled "Extendable Auto Safety Belt Accessory," illustrates a design apparently comprising a flaccid webbing strap with a male latch tongue at one end and a female receptacle at the opposite end. As such, the Laney design appears to be more closely related to the seat belt extender of the Lewis '282 U.S. Patent discussed further above, than to the present invention with its limited flexibility.

Finally, German Patent Publication No. 3,342,594 published on Jun. 5, 1985, titled "Fastening Of A Child-Safety Device To A Seat Of A Motor Vehicle," describes (according to the drawings and English abstract) a child safety seat having a lap belt extending thereacross. A supplemental male tongue is removably secured to the conventional seat belt and shoulder harness pair, with the seat belt of the child seat securing to this temporarily installed tongue and to the opposite anchor receptacle of the restraint system. While an extension belt is provided with the device of the '594 German Patent Publication, it is a flaccid, flexible belt which passes through the structure of the associated child safety seat. No semi-rigid extension having limited flexibility and providing single hand latching of the male tongue component to the female receptacle of the extension is disclosed in the '594 German Patent Publication, nor in any other disclosure of which the present inventors are aware.

None of the above inventions and patents, taken either singly or in combination, is seen to describe the instant invention as claimed. Thus a seat belt extender solving the aforementioned problems is desired.

SUMMARY OF THE INVENTION

The present seat belt extender provides a means for persons having limited shoulder, arm, and/or upper body mobility due to recent surgery, rotator cuff injury, arthritis, etc., to be able to secure a conventional three point seat belt and shoulder harness assembly without undue effort, pain, or strain. The seat belt extender of the present invention comprises a length of material having limited flexibility, with a male seat belt latch tongue at one end and a female seat belt latch receptacle at the opposite end. The limited flexibility of the present seat belt extender enables it to be secured to the existing relatively short anchor attachment conventionally located near the center of a vehicle, from which it stands upright for ease of access. This upright position provided by the present seat belt extender enables an occupant using the associated seat belt system to attach the free end of the belt and shoulder harness assembly easily without strain, due to the raised position of the seat belt receptacle of the present extension.

The use of the present seat belt extender provides other benefits, as well. The resulting placement of the juncture of the shoulder harness and lap belt ends nearer to the center of the lap of the occupant results in the portion of the shoulder strap passing across the chest of the occupant being positioned more nearly across the center of the chest. This provides significantly greater comfort for women using the present extender. This also results in the portion of the shoulder strap passing over the shoulder being positioned somewhat away from the neck of the occupant in order to avoid bearing against the side of the neck of the occupant.

The present seat belt extender is constructed of materials permitting limited flexibility, in order to allow the extender to conform to the contours of the adjacent seat structure and/or the hip of the occupant using the extender and associated seat belt system. The limited flexibility of the present extender provides some “give” or resilience in the event of an impact in which the occupant is thrown against the belt and extender assembly. The limited flexibility may be provided by means of the use of a number of different materials, e.g. a plastic or rubber sleeve installed over an otherwise flaccid length of webbing material, a rubberized or plasticized length of cable, etc., as desired.

Accordingly, it is a principal object of the invention to provide a seat belt extender comprising a length of material having a male seat belt attachment tongue extending from one end thereof, and a female seat belt attachment receptacle extending from the opposite end thereof.

It is another object of the invention to provide a seat belt extender having limited flexibility in order to stand upright when attached only to the central anchor component of the existing seat belt assembly, but to conform to the side of the seat and/or hip of the occupant when the seat belt and shoulder harness latch tongue of the existing seat belt assembly is secured thereto across the occupant.

It is a further object of the invention to provide a seat belt extender in which the generally stiff but non-rigid portion comprises a flat strap.

Still another object of the invention is to provide a seat belt extender in which the generally stiff but non-rigid portion comprises a cable or the like having a round cross section.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a seat belt extender, for use with a conventional three point seat belt and shoulder harness restraint system. Such three point systems comprise (1) an elongate seat belt, which extends from an anchor point and across the lap of a seated occupant; (2) a shoulder strap extending from an outboard position above and behind the occupant, with the shoulder strap generally extending from a take-up reel and forming a single length of webbing material with the seat belt; and (3) a relatively short anchor extending from a point near the centerline of the vehicle. A male seat belt latch tongue is slidably or adjustably placed along the seat belt and shoulder harness strap, with the tongue serving to engage the mating seat belt latch receptacle of the anchor component and to differentiate the seat belt strap from the shoulder harness strap. The anchor component has a relatively short length, in order to position the latch assembly near the inboard hip of the occupant of the seat, i.e., the hip closest to the centerline of the vehicle. The anchor component is generally configured to have limited flexibility, in order to stand upright from its single attachment point while still flexing to conform to the tension applied thereto when the seat belt and shoulder harness straps are secured thereto.

This three point seat belt and shoulder harness configuration is suitable for many, if not most, occupants of vehicles equipped with such systems. However, the relatively short length of the anchor component places the latch assembly near the inboard hip of the seat occupant, as noted above. This can cause difficulty for some persons in reaching the receptacle at the end of the anchor component, particularly if they have limited upper body mobility for some reason, e.g. tendonitis, rotator cuff injury or surgery, bursitis, etc.

Figure 1:
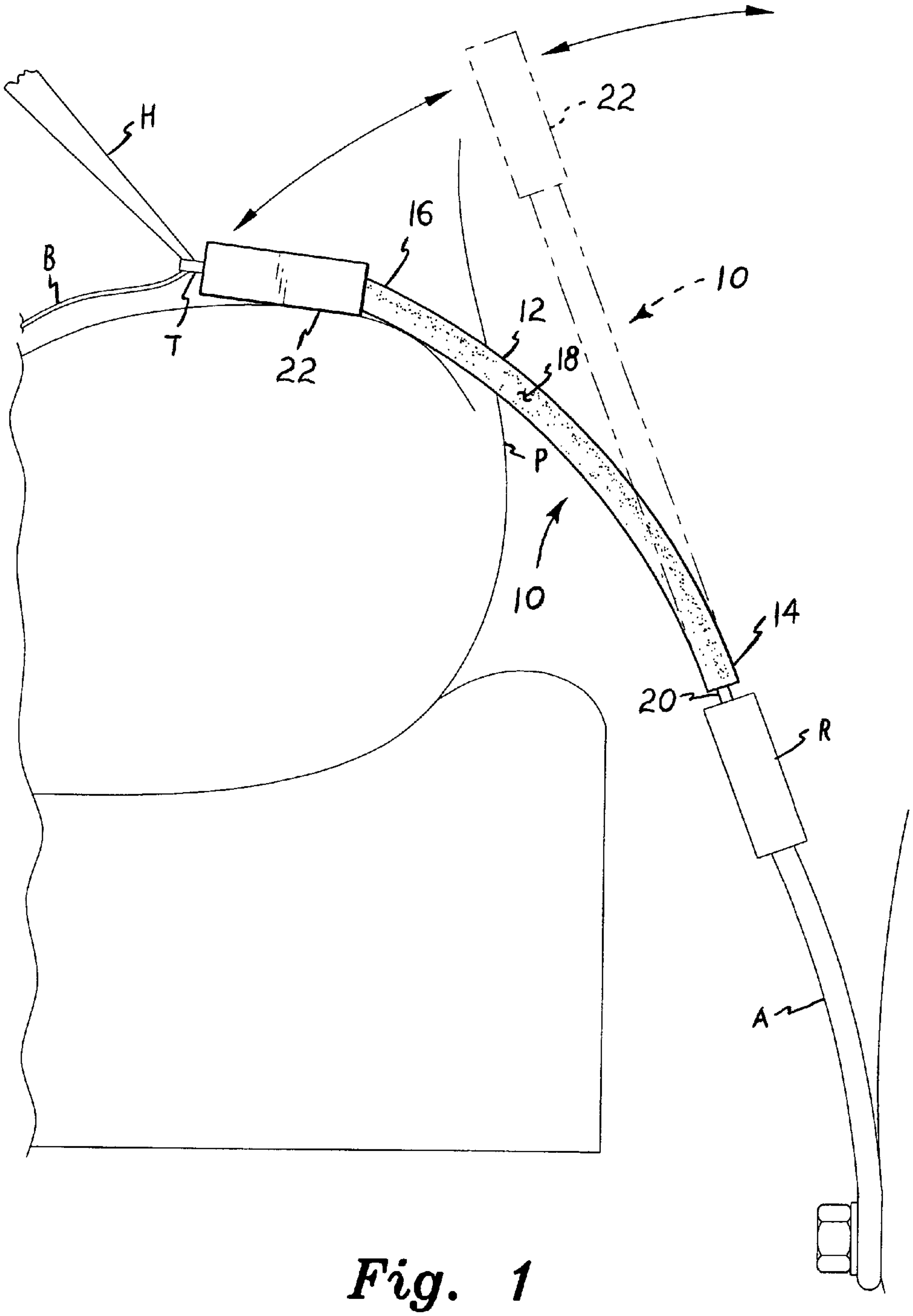
FIG. 1 is a front elevation view of a first embodiment of the present seat belt extender connected to an existing seat belt anchor, showing the use and limited flexibility of the extender.
Figure 2:
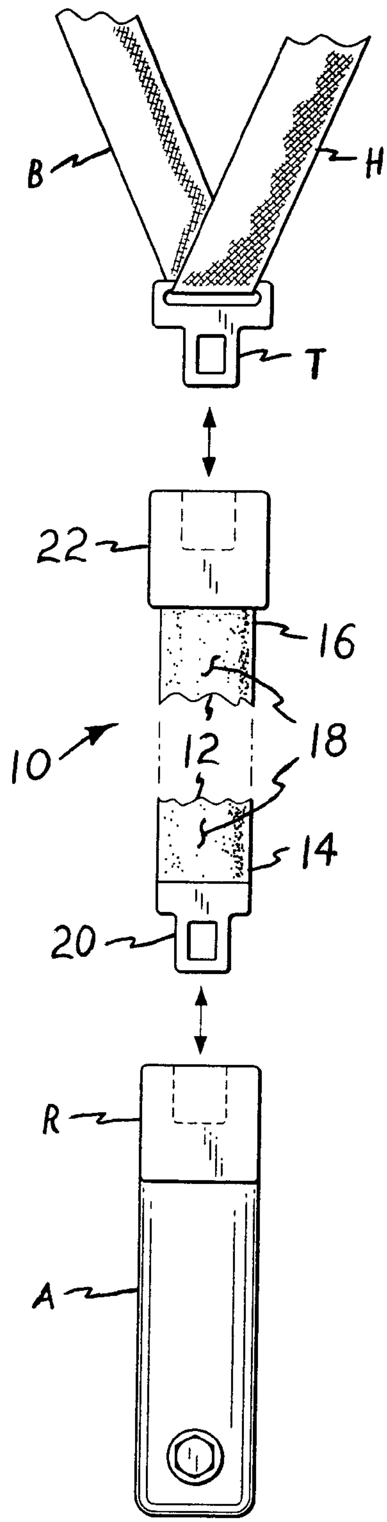
FIG. 2 is an exploded side elevation view of the seat belt extender of FIG. 1, showing its connection to the elements of an existing three point belt and shoulder strap system.

The seat belt anchor extension of the present invention provides a solution to this problem, by serving to shift or move the attachment point for the male seat belt latch tongue to a point closer to the center of the lap of the occupant. FIG. 1 of the drawings provides a front elevation view, i.e., looking from the front toward the rear of a vehicle in which the present invention is in use, of a first embodiment of the present seat belt extender, designated by the reference numeral 10 throughout the drawings. FIG. 2 provides a side elevation view of the extender 10 and the conventional seat belt and shoulder harness components to which it attaches.

The seat belt extender 10 comprises a flat, elongate anchor extension strap 12 having a first or latch tongue end 14 and an opposite second or receptacle end 16. The strap 12 may be formed of a number of different materials, but is preferably formed of like materials to those used in the construction of the seat belt anchor component A, shown bolted to the center structure of the vehicle in FIG. 1. A relatively heavy webbing woven from a tough and durable synthetic fabric is suitable for such purposes. Additional stiffness for the extender 10 may be provided by installing the strap 12 within a rubber or plastic outer sleeve 18, or by coating or impregnating the webbing of the strap 12 with a rubber or plastic layer or material 18, as desired. Such a rubberized or plasticized sleeve, coating, or material 18 limits the flexibility of the device, while still providing some limited flexibility to allow the extension 10 to flex and bend to a certain extent while being used. The anchor extension strap 12 may be formed in any desired length, but preferably a series of lengths from one inch to eight inches is provided, to allow users to select the offset of the seat belt and shoulder harness connection thereto as desired.

A male seat belt latch tongue 20 is immovably affixed to and extends from the first end 14 of the strap 12, with a female seat belt latch receptacle 22 immovably affixed to and extending from the opposite second end 16 of the device. The term "immovably affixed" is intended to mean that these components 20 and 22 remain aligned longitudinally with their respective ends 14 and 16 of the anchor extension strap 12 at all times, and are not loosely attached to their respective ends. The tongue 20 is installed removably within the anchor receptacle R, as is known in the art, to install the present seat belt extender 10 in the belt and harness system.

The limited flexibility of the conventional anchor component A, along with the limited flexibility or semi-rigid property of the present seat belt extender 10 and the inflexible attachment provided by the conventional anchor receptacle R and latch tongue 20 of the extender 10, result in the extender 10 and its female latch receptacle 22 remaining generally upright so long as no lateral force is applied to the assembly, generally as indicated by the broken line position of the extender 10 shown in FIG. 1. The elevated receptacle 22 is thus easily accessed for the removable installation of the latch tongue T, located at the juncture of the seat belt B and shoulder harness H of the conventional seat belt and shoulder harness assembly. However, when the retraction reel conventionally provided at the attachment end of the shoulder harness strap H applies some tensile force to the belt and shoulder harness assembly, the extension 10 is flexed laterally across or against the side of the vehicle seat and/or the pelvic structure P of the occupant of the seat to assume a curved or flexed position generally, as shown by the solid line illustration of the extender 10 in FIG. 1.

It is important that the present seat belt extender 10 be capable of such limited flexibility, as the ability of the extender 10 to remain upright when no force is applied thereto greatly facilitates the attachment of the existing seat belt latch tongue T thereto by persons having limited upper mobility and who may be able to extend only one hand to a limited degree. Yet, it is essential that the extender 10 be capable of conforming to the shape of the side of the seat and/or pelvic or hip area of the occupant of the seat, in order to position the latch receptacle 22 close to the lap of the seat occupant. Otherwise, the lap belt B would fit much too loosely across the lap of the occupant, and would provide insufficient restraint in the event of an accident.

Figure 3:
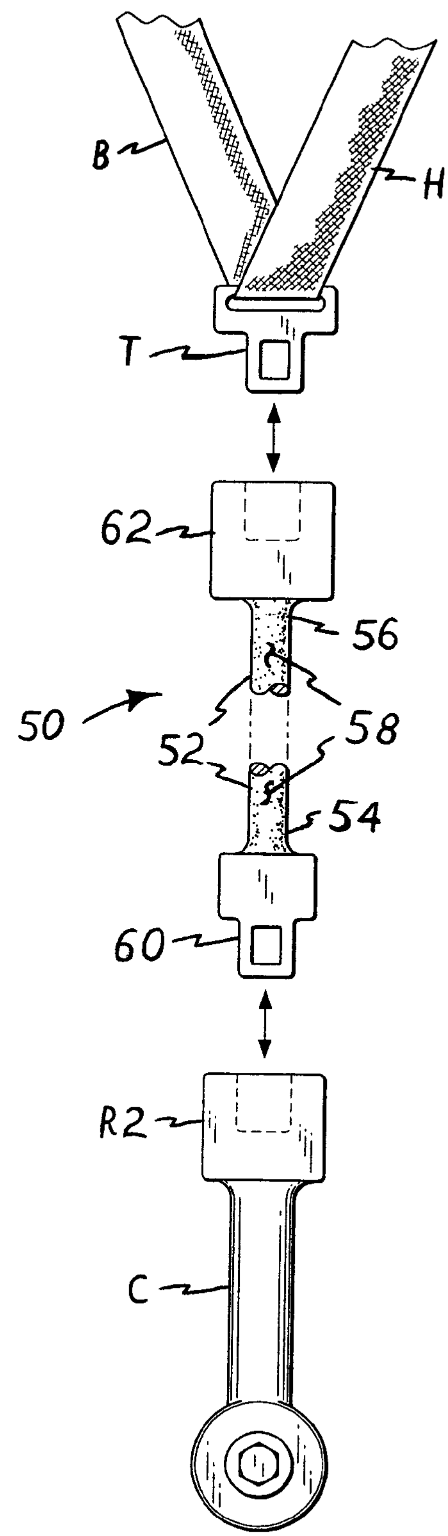
FIG. 3 is an exploded side elevation view of an alternative embodiment of the present seat belt extender, comprising a flexible cable configuration.

FIG. 3 illustrates an alternative embodiment of the present seat belt extender, designated as extender 50. The extender 50 of FIG. 3 functions in essentially the same manner as that described above for the extender 10 of FIGS. 1 and 2. However, rather than forming the extension portion between the two latch components as a flat strap, the extender 50 has an elongate extension cable 52, preferably between one and eight inches in length. Other lengths may be provided as desired. The cable 52 is also limited in its flexibility, in order to stand upright when the device is latched to the existing anchor component. However, the cable configuration with its generally circular cross section may permit the extender 50 to flex in any direction perpendicular to the cable axis, whereas the flat strap 12 of the extender 10 limits flexing across the width of the device.

The cable 52 of the seat belt extender 50 of FIG. 3 includes a first end 54 and an opposite second end 56, with the cable 52 preferably being covered or coated with a rubberized or plasticized sheath or coating 58. The cable 12 may be formed of various suitable materials, e.g. steel or other metallic strands, synthetic strands or fibers, etc., as desired, with the sheath or coating 58 serving to protect the fibers or strands, and also to adjust the flexibility of the assembly as desired. A male seat belt latch tongue 60 is immovably affixed to and extends from the first end 54 of the cable 52, with a female seat belt latch receptacle 62 being immovably affixed to and extending from the opposite second end 56 of the cable 52.

The cable type seat belt extender 50 of FIG. 3 is used in the same manner as that described further above for the strap type extender 10, i.e. the male tongue 60 is installed in the existing receptacle R2 of the cable type seat belt anchor C, whereupon it extends flexibly upwardly therefrom to provide for the installation of the tongue T of an existing seat belt B and shoulder harness strap H, generally as shown in FIG. 3. It will be noted that the cable type extender 50 may be used with the strap type anchor A of FIG. 2, and/or the strap type extender 10 of FIG. 2 may be used with a cable type anchor C of FIG. 3, if so desired, as the latch tongues 20 and 60 are identical to one another, and cooperate with the identical receptacles R and R2. The same arrangement is true of the seat belt and shoulder harness tongues T and the female receptacles 22 and 62 of the two extenders 10 and 50.

Figure 4:
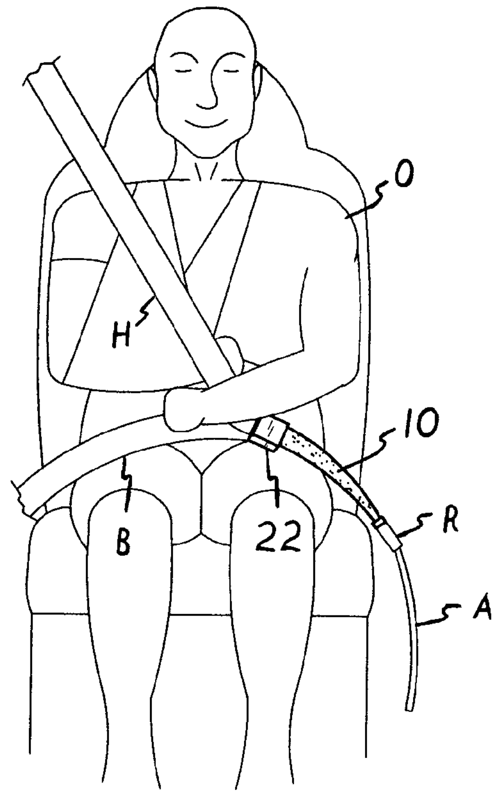
FIG. 4 is an environmental front elevation view, showing the operation and use of the present seat belt extender by a person having limited mobility.
Figure 5:
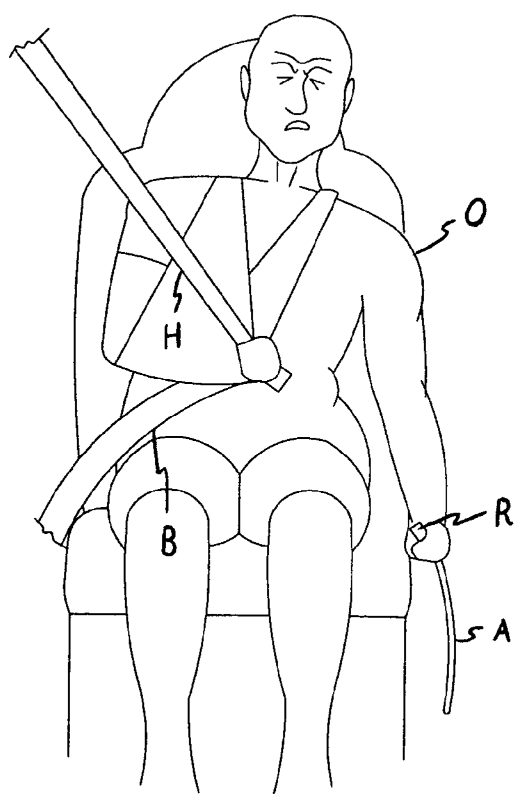
FIG. 5 is an environmental front elevation view, showing the difficulty of the operation and use of a conventional three point belt and shoulder strap system by a person having limited mobility.

FIGS. 4 and 5 respectively provide illustrations of the use of the present extender and of the difficulty in latching a seat belt and shoulder harness assembly to an existing short anchor component by a person having limited upper body mobility. In FIG. 4, a strap type extender 10 of the present invention has been connected to an existing seat belt anchor A. The latch receptacle 22 of the extender 10 essentially displaces the attachment point for the seat belt B and shoulder harness strap H to a more easily accessible location nearer the center of the lap or waist of the occupant O who is suffering from limited upper body mobility. Using the seat belt extender 10 or 50, the occupant O may easily reach the latch receptacle 22 location without undue stress or movement.

FIG. 5 clearly illustrates the problem of existing conventional seat belt and shoulder harness systems with their relatively short anchor components. In FIG. 5, the occupant O must somehow extend the existing seat belt B and shoulder harness H assembly completely across his body and downwardly to reach the relatively low location of the conventional anchor receptacle R. The requirement for the occupant to twist his upper body, and/or extend an injured arm or flex an injured shoulder in order to accomplish this, places considerable undue strain upon the occupant, and may lead to aggravating an injury or possibly reinjuring a part of the body which was nearly healed.

In conclusion, the present seat belt extender in its various embodiments provides a much needed means for persons having limited mobility to conveniently secure a seat belt and shoulder harness assembly in a vehicle, without undue pain or effort. Nearly everyone recognizes the safety benefits of such seat belt and shoulder harness systems, and in fact the use of such systems is required in most jurisdictions. However, the difficulty and pain associated with the securing of conventional seat belt and shoulder harness systems without the extender of the present invention may result in many persons foregoing the use of such conventional restraint systems. The potential hazard and illegality of the failure to use a restraint system in a motor vehicle are obvious. The seat belt extender of the present invention provides all persons with a quick and easy means of securing their seat belt and shoulder harness system, without discomfort, pain, or risk of injury. Accordingly, the present seat belt extender in its various embodiments will prove to be a most useful and desirable accessory for many vehicle occupants.

It is to be understood that the present invention is not limited to the embodiments described above, but encompasses any and all embodiments within the scope of the following claims.

We claim:

1. A seat belt extender, comprising:

a flat, elongate strap of limited flexibility, having a first end and a second end opposite said first end, wherein said strap is formed of synthetic fabric webbing material;

a male seat belt latch tongue comprising a single flat plate and an aperture extending through said plate, said latch tongue adapted to install removably within a conventional anchor receptacle of a conventional seat belt anchor component, said latch tongue being immovably affixed to and extending from said first end of said strap;

a female seat belt latch receptacle immovably affixed to and extending from said second end of said strap, said female seat belt latch receptacle adapted to receive the latch tongue of a conventional seat belt and shoulder harness assembly; and a non-removable, generally stiff, semi-rigid cover that coats or impregnates said strap;

wherein said seat belt extender will stand upright when attached to said conventional seat belt anchor component until a lateral force is applied to said seat belt extender.

2. The seat belt extender according to claim 1, wherein said cover is selected from the materials consisting of rubber and plastic.

3. The seat belt extender according to claim 1, wherein said strap is between one inch and eight inches in length.

* * * * *